United States Patent
Bretschneider (10) Patent No.: US 11,822,317 B2
(45) Date of Patent: Nov. 21, 2023

(54) OPERATOR-DEFINED AVOIDANCE OF CHATTER

(71) Applicant: SIEMENS AKTIENGESELLSCHAFT, Munich (DE)

(72) Inventor: Jochen Bretschneider, Owingen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/290,600

(22) PCT Filed: Oct. 24, 2019

(86) PCT No.: PCT/EP2019/079018
§ 371 (c)(1),
(2) Date: Apr. 30, 2021

(87) PCT Pub. No.: WO2020/094409
PCT Pub. Date: May 14, 2020

(65) Prior Publication Data
US 2021/0356942 A1 Nov. 18, 2021

(30) Foreign Application Priority Data
Nov. 5, 2018 (EP) .................................... 18204305

(51) Int. Cl.
*G05B 19/416* (2006.01)
*G05B 19/19* (2006.01)

(52) U.S. Cl.
CPC ......... *G05B 19/4163* (2013.01); *G05B 19/19* (2013.01); *G05B 2219/35032* (2013.01);
(Continued)

(58) Field of Classification Search
CPC ................ G05B 19/4163; G05B 19/19; G05B 2219/35032; G05B 2219/41115;
(Continued)

(56) References Cited

U.S. PATENT DOCUMENTS 5,101,599 A    4/1992  Takabayasi et al.
5,170,358 A *  12/1992 Delio ................. G05B 19/4163
                                                            702/56
(Continued)

FOREIGN PATENT DOCUMENTS

CA    2089335 A1   8/1993
CA    2141226 A1   8/1995
(Continued)

OTHER PUBLICATIONS

PCT International Search Report and Written Opinion of International Searching Authority dated Apr. 14, 2020 corresponding to PCT International Application No. PCT/EP2019/079018 filed Oct. 24, 2019.

(Continued)

*Primary Examiner* — Kenneth M Lo
*Assistant Examiner* — Mohammed Shafayet
(74) *Attorney, Agent, or Firm* — Henry M. Feiereisen LLC (57) ABSTRACT

A control device of a machine tool receives a target machining, in accordance with which a workpiece should be machined by a tool of the machine tool. The control device also receives via a human-machine interface or via an interface to an external memory device a selection, a parameterization and/or a specification of a sequence of predefined rules, which define the manner in which the machining of the workpiece should be modified in the event of undesired vibrations during machining. When undesired vibrations do not occur, as determined from acquired sensor signals, (Continued)

machining is carried out in accordance with the target machining. When undesired vibrations occur, the machining is modified in accordance with the rules, wherein the control device selects the rules in accordance with the selection, parameterizes the rules in accordance with the parameterization and/or carries out the rules in accordance with the specified sequence.

7 Claims, 4 Drawing Sheets

(52) U.S. Cl.
CPC ............... *G05B 2219/41115* (2013.01); *G05B 2219/41256* (2013.01); *G05B 2219/42077* (2013.01); *G05B 2219/42344* (2013.01)

(58) Field of Classification Search
CPC ........... G05B 2219/41256; G05B 2219/42077; G05B 2219/42344; B23Q 17/0976
See application file for complete search history.

(56) References Cited

U.S. PATENT DOCUMENTS

| | | |
|---|---|---|
| 2008/0271530 A1 | 11/2008 | Arakawa et al. |
| 2010/0104388 A1 | 4/2010 | Suzuki et al. |
| 2012/0093603 A1 | 4/2012 | Ueno |
| 2012/0101624 A1* | 4/2012 | Ueno ................ B23Q 17/0976 700/173 |
| 2016/0116899 A1* | 4/2016 | Piner ................ B23Q 17/12 700/173 |
| 2017/0060104 A1* | 3/2017 | Genma ............. G05B 13/0265 |
| 2018/0209839 A1 | 7/2018 | Bitterolf et al. |
| 2019/0033821 A1* | 1/2019 | Kamiya ............. G05B 19/404 |

FOREIGN PATENT DOCUMENTS

| | | | |
|---|---|---|---|
| CN | 102554685 A | 7/2012 | |
| CN | 104786101 A | 7/2015 | |
| CN | 105549544 A | 5/2016 | |
| CN | 101722438 A | 6/2016 | |
| CN | 107942953 A | 4/2018 | |
| DE | 2415503 A1 | 11/1974 | |
| DE | 4121148 A1 | 1/1992 | |
| DE | 4406660 A1 | 8/1995 | |
| DE | 102004016731 A1 | 10/2005 | |
| DE | 102010026947 B3 | 12/2011 | |
| EP | 1988436 A2 | 11/2008 | |
| WO | WO-2014115395 A1 * | 7/2014 | ........... G05B 19/404 |
| WO | WO 2017/012801 | 1/2017 | |

OTHER PUBLICATIONS

Yong Xia: "Experimental implementation of artificial neural network-based active vibration control & chatter suppression" Ryerson University Jan. 1, 2010.

* cited by examiner

OPERATOR-DEFINED AVOIDANCE OF CHATTER

CROSS-REFERENCES TO RELATED APPLICATIONS

This application is the U.S. National Stage of International Application No, PCT/EP2019/079018, filed Oct. 24, 2019, which designated the United States and has been published as International Publication No. WO 2020/094409 A1 and which claims the priority of European Patent Application, Serial No, 18204305.9, filed Nov. 5, 2018, pursuant to 35 U.S.C. 119(a)-(d).

BACKGROUND OF THE INVENTION

The present invention is based on a machining method for a workpiece by means of a tool of a machine tool,
wherein a control device of the machine tool receives a target machining, in accordance with which the workpiece should be machined by the machine tool,
wherein the control device controls the machine tool so that the workpiece is machined by the tool,
wherein the control device, during the machining of the workpiece by the tool, determines by evaluating captured sensor signals whether undesired vibrations are occurring or not,
wherein predefined rules are stored in the control device
wherein the rules define the manner in which, in the event of undesired vibrations occurring during the machining of the workpiece by the tool, the machining of the workpiece by the tool is to be modified,
wherein the control device, in the event of the undesired vibrations not occurring, carries out the machining in accordance with the target machining and, in the event of the undesired vibrations occurring, modifies the machining according to the rules.

The present invention is furthermore based on a control program for a control device of a machine tool, wherein the control program comprises machine code, wherein the processing of the machine code by the control device causes the control device to carry out such an operating method.

The present invention is furthermore based on a control device of a machine tool, wherein the control device is programmed with such a control program, so that, when it is operating, the control device carries out such an operating method.

The said subject matter is known from DE 44 05 660 A1.

Metal-cutting machining of workpieces by machine tools can result in an undesired excitation of vibrations. The vibrations can occur at the machine tool, at the workpiece or at the tool. They are known as chattering by those skilled in the art. Chattering leads as a general rule to a lower-quality surface of the machined workpiece. Furthermore chattering leads to increased wear in bearings and guides of the machine tool. In many cases it can even result in direct damage, to tool breakage for example.

Various procedures for avoiding chattering are known. In the simplest case a feed speed and/or a rotational speed of the spindle at which the tool or the workpiece is rotated can be reduced, in this case, provided the chattering is reduced by the measure taken, although the workpiece is machined correctly, the machining takes longer and is thus done with reduced productivity. Other procedures are also known. For example overlaying an oscillation on a predetermined and constant spindle speed is known, so that the actual spindle speed varies around the predetermined spindle speed.

In practice however the known measures are only rarely employed. In practice an operator of the machine tool generally intervenes instead into the machining. In particular the operator generally uses what are referred to as overrides to adjust the feed speed and/or rotational speed of the spindle. Mostly this leads very quickly to a decay of the chattering. The procedure is therefore often characterized by great success, because the operator, as a result of their technical knowledge, often knows very well the points in the machining at which chattering can occur and how the chattering can be counteracted. Here however the same measure is not successful in every machining process. Instead it depends on the actual machining process whether—for example—a reduction of the spindle speed or a reduction of the feed speed or possibly even an increase in the spindle speed or the feed speed will lead to the chattering no longer occurring.

The object of the present invention consists of creating opportunities by means of which the operator can incorporate their empirical knowledge into the machining process in a simple and reliable way and thereby chattering can be avoided, at least in the overwhelming majority of cases.

SUMMARY OF THE INVENTION

The object is achieved by an operating method as set forth hereinafter. Advantageous embodiments of the operating method are the subject matter of dependent claims.

In accordance with the invention an operating method of the type stated at the start is embodied in that,
the control device of the machine tool, before the workpiece is processed, receives via an interface a selection, a parameterization and/or a specification of a sequence of rules,
the interface is embodied as a human-machine interface and the control device receives from the operator the selection, the parameterization and/or the specification or the sequence of rules and/or the interface is embodied as an interface to a memory device arranged outside the control device (6), from which the control device reads out the selection, the parameterization and/or the specification or the sequence of the rules, and
the control device selects the rules according to the selection, parameterizes them according to the parameterization and/or carries them out, according to the specification of the sequence, in this sequence.

The possibility is thus created of specifying in a simple manner in concrete terms for the respective machining process, how the control device is to react in the event of the undesired vibrations (chattering) occurring. Thus there is the opportunity for the operator to incorporate their empirical knowledge into the control device.

The rules as such are thus actually already predefined within the control device. There is the opportunity however to select which rules are to be applied. Furthermore there is the opportunity of parameterizing the selected rules. There is also the opportunity of specifying the sequence of the rules. Specifying the sequence of the rules means that it is defined for a specific rule which preceding rules in the sequence must have been carried out without success beforehand before the specific rule is carried out. Within the framework of the present invention the control device thus makes available to the operator the predefined rules as such—for example within the framework of the operating system of the control device—as a tool for example. The operator only has to select, parameterize and/or specify the sequence of these already predefined rules.

For example the parameterization can specify a step rate of a machining parameter of the target machining not influencing the contour of the workpiece. This enables the chattering to be suppressed without influencing the contour of the finished workpiece. Examples of such machining parameters are especially a spindle speed and a feed speed. However other machining parameters also come into consideration, for example parameters of closed-loop control circuits, in particular proportional amplifications and/or reset times of closed-loop position controllers.

In principle it is possible for the control device to continue to change the specified machining parameters when the undesired vibrations occur. Preferably however the parameterization specifies a maximum value of the machining parameter of the target machining not influencing the contour of the workpiece. This enables it to be guaranteed that the respective machining parameter remains within a technically sensible range.

Preferably the parameterization specifies a hold time during which the modified target machining will be retained after a modification of the machining. What is achieved by this is that, after a modification of the machining, i.e, after for example a change to a machining parameter, there is initially a wait to see whether the chattering subsides and the machining thus stabilizes itself.

In the simplest case only an individual rule with a single machining parameter is predetermined. It is however likewise possible, through the corresponding selection, parameterization and/or specification of the sequence of the rules, for a series and/or a coupling of the changing of a number of machining parameters not influencing the contour of the workpiece to be specified to the target machining. For example it can be predetermined that initially a machining parameter (for example the spindle speed) is changed, but when this change does not lead to the chattering subsiding, for another machining parameter not influencing the contour of the workpiece (for example the feed speed) also to be changed. It can also be specified that in the case of chattering that a number of machining parameters be changed simultaneously, for example both the spindle speed and also the feed speed. Other embodiments are also possible.

Thus, as a result, which machining parameter of the target machining not influencing the contour of the workpiece or which machining parameters of the target machining not influencing the contour of the workpiece is or are to be changed can be defined by the selection or the parameterization of the rules.

Furthermore it is possible for the selection or parameterization of the rules to specify whether, in the case in which, after a modification of the machining of the workpiece the undesired vibrations no longer occur, the modification will be cancelled again. If the modification is not cancelled again, on the one hand it is insured with high probability that the chattering will also continue to be suppressed. In many cases however the chattering only occurs at a few points in the machining. In this case the machine tool would work with reduced productivity, without this being necessary. Through the specification (or selection) of a corresponding rule the measure that is preferred can be predetermined.

Preferably the parameterization of the rules also specifies in this case the stages in which the modification is to be cancelled again. The stages essentially correspond to the step rate in the modification. It is possible however to define them independently of the step rate in the modification.

Preferably the rules further specify a holding time, during which the machining will be retained unchanged after a cancellation. This enables there to be a wait before a further cancellation to see whether chattering starts up once again.

Preferably the rules specify which measures are to be taken if the undesired vibrations continue to occur despite modification of the machining. For example this can provide the opportunity to carry out the machining despite the chattering (and undertake any necessary post-processing in some other way) or—for example to avoid damage to the machine or to avoid scrap being produced—to stop the machining.

Preferably, when after a modification of the machining the undesired vibrations no longer occur, the control device stores the type of machining found, so that it can be called up again for a later machining of a further workpiece similar to the workpiece. This makes it possible, during the later machining of the similar workpiece, either at the corresponding point in the machining—alternatively unconditionally or only in the case that chattering occurs again at the corresponding point in the machining—to call up the type of machining found once more. This enables a time-consuming and less than optimal intervention into the correct machining to be avoided.

The object is furthermore achieved by a control program with the features of claim 9. In accordance with the invention the processing of the machine code by the control device causes the control device to carry out an inventive operating method.

The object is furthermore achieved by a control device with the features of claim 10. In accordance with the invention the control device is programmed with an inventive control program, so that, when it is operating, the control device carries out an inventive operating method.

BRIEF DESCRIPTION OF THE DRAWING

The characteristics, features and advantages of this invention described above, as well as the manner in which they are achieved, will become clearer and easier to understand in conjunction with the description given below of the exemplary embodiments, which will be explained in greater detail in conjunction with the drawings. In the figures, in schematic diagrams.

DETAILED DESCRIPTION OF PREFERRED EMBODIMENTS

Figure 1:
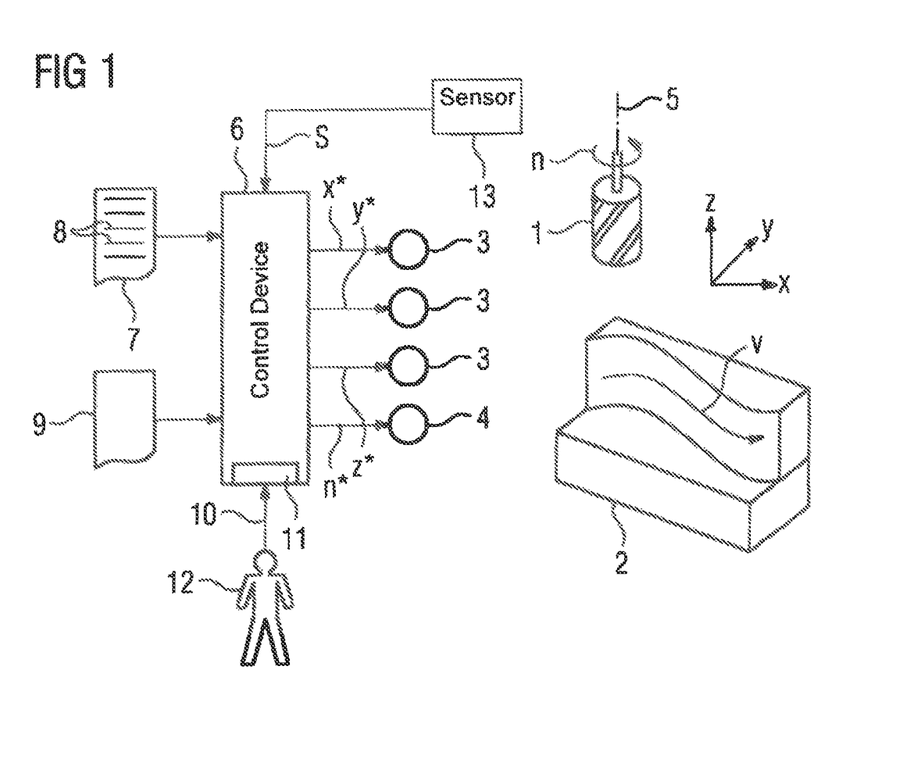
FIG. 1 shows a machine tool and its components.

In accordance with FIG. 1 a workpiece 2 is to be machined by means of a tool 1 of a machine tool. The machining can be milling for example. For machining of the workpiece 2 the tool 1 is positioned relative to the workpiece 2 under position control at the workpiece 2 by means of a number of position-controlled axes 3 of the machine tool. By means of the axes 3 the translational position x, y, z and if necessary also the rotational orientation of the tool 1 relative to the workpiece 2 can be set. The target values x*, y*, z for the position-controlled axes 3 and thus the position x, y, z and if necessary also the orientation of the tool 1 relative to the workpiece 2 is continuously changed. The tool 1 is moved by this at a path velocity v along a path to be traveled. During the movement of the tool 1 relative to the workpiece 2 the tool 1 is furthermore rotated by means of a further axis 4 of the machine tool at a speed n about an axis of rotation 5 of the tool 1. A corresponding value for target speed of rotation n* can be specified to the further axis 4. In this case the further axis 4 is speed-controlled. As an alternative the further axis 4 can also be position-controlled. In this case the predetermined target position value must be varied accordingly.

The machine tool is controlled by a control device 6. The control device 6 is embodied as a rule as a numerical controller. The control device 6 is programmed with a control program 7. The control program 7 comprises machine code 8, which is able to be executed by the control device 6. The programming of the control device 6 with the control program 7 or the processing of the machine code 8 by the control device 6 causes the control device 6 to carry out an operating method, which will be explained in greater detail below in conjunction with FIG. 2.

Figure 2:
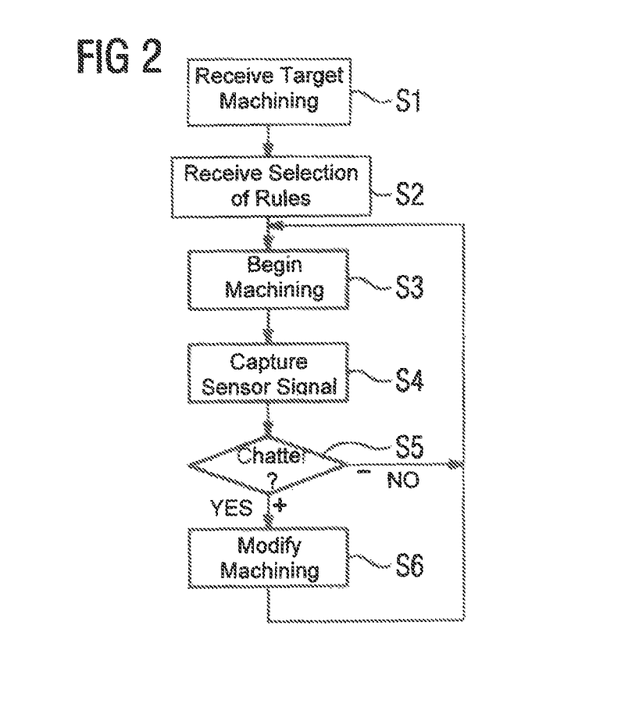
FIG. 2 shows a flow diagram.

In accordance with FIG. 2, in a step S1, the control device 6 receives a target machining 9. The workpiece 2 should be machined by the tool 1 in accordance with the target machining 9. In the target machining 9, as well as the sequence of target position values x*, y*, z*, (and thus of the path to be traveled) machining parameters are also specified, such as for example the target speed value n* for the further axis 4 and a target value v* for the path velocity v are specified in sections. The target machining 9 can be predetermined for example in the form of a subroutine generally known to persons skilled in the art.

Stored in the control device 6 are predefined rules 10. The rules 10 define the manner in which the machining of the workpiece 2 by the tool 1 is to be modified if undesired vibrations occur during the machining of the workpiece 2 by the tool 1. Possible rules 10 will be explained in greater detail later. It is important however that the contour of the workpiece 2 to be produced is not changed by the rules 10, but just machining parameters that do not influence the contour. Examples of such machining parameters are the already mentioned path velocity v and the likewise already mention rotational speed n. In particular the rules 10 can specify an increment δn, δv of the change in the corresponding machining parameter n, v of the target machining 9.

In a step 32 the control device 6 receives a selection, a parameterization and/or a specification of a sequence of the rules 10 (see FIGS. 3 to 9). This enables the rules 10 to be defined specifically for the respective target machining 9. The selection, the parameterization and/or the specification of the sequence can be predetermined to the control device 6 according to the diagram in FIG. 1 via a human-machine interface 11 by an operator 12. As an alternative they can be predetermined to the control device 6 via a corresponding interface via a memory device. In this case the control device 6 reads out the selection, the parameterization and/or the specification of the sequence from the memory device. The memory device is arranged outside the control device 6. It can be able to be detachably connected to the control device 6 (for example in the case of an embodiment of the interface 11 as a USB interface) or (for example in the case of the embodiment of the interface 11 as a link to a computer network) it can be a component of another computer.

According to the diagram in FIG. 2, the step S1 is carried out before the step S2. It can however be the other way round. The decisive factor is that the specification of the selection, the parameterization and/or the specification of the sequence of rules 10 are done before the machining of the workpiece 2 by the tool 1.

In a step S3 the control device 6 then begins the machining of the workpiece 2 by the tool 1. This is done by the control device 6 controlling the machine tool and in particular the position-controlled axes 3 and the further axis 4 according to the target machining 9. The workpiece 2 is thereby machined according to the specified target machining 9.

During the machining of the workpiece 2, in a step S4, the control device 6 captures a sensor signal S by means of (at least) one sensor 13. Based on the step S4, the control device 6 checks, by evaluating the sensor signal S in a step S5, whether during the machining of the workpiece 2 by the tool 1, an undesired vibration (chattering) is occurring. Suitable sensor signals S are generally known to persons skilled in the art. The captured sensor signal S can for example be a sound signal (airborne sound or body-borne sound), an error in the speed n of the tool 1 or another signal. Reference can be made in this regard to WO 2017/012 801 A1 already mentioned.

If the control device 6 does not establish any chattering in step S5 the control device 6 returns to step S3. It thus continues the machining of the workpiece 2 by the tool 1 without any modification to the target machining 9. If on the other hand the control device 6 establishes chattering in step S5, the control device 6 goes to a step S6. In step S6 the control device 6 modifies the machining of the workpiece 2 by the tool 1 according to the rules 10. The control device 6 takes account in this case of the selection, the parameterization and/or the specification of the sequence of the rules 10.

Explained below in conjunction with FIGS. 3 to 9 are possible rules 10 and possible parameterizations.

Figure 3:
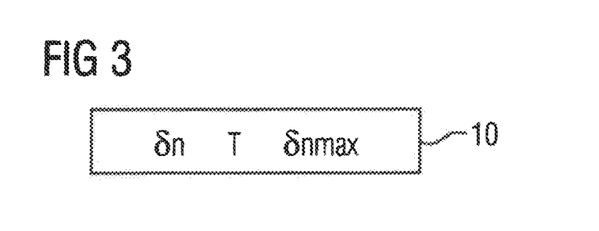
FIGS. 3 to 9 show rules.

For example it is possible for a parameterization for a rule 10 to consist of a change in rotational speed δn being predetermined according to the diagram shown in FIG. 3 for rule 10 as a control parameter. In this case, if chattering occurs and the corresponding rule 10 is carried out, the target speed n* (and as a result also the actual speed n) is changed by the change in rotational speed Sn. The change in rotational speed on will be negative as a rule (reduction in the speed n). It can also be positive in individual cases however (increase in the speed n).

Preferably, in the case of the rule 10 shown in FIG. 3, a further rule parameter is predetermined as part of its parameterization, namely a hold time T. The hold time T specifies for how long after an application of the rule 10 the corresponding rule 10 will not be applied again. After a modification the modified target machining will thus be retained unchanged during the hold time T. What this achieves is that the transient state of the machine tool that arises through the change to the rotational speed n goes into a stable state again. Only after this time is a check made again as to whether chattering is still occurring.

As an alternative or In addition to the hold time T, in the case of the rule 10 shown in FIG. 3, a further rule parameter can be predetermined as part of its parameterization, namely a maximum change in rotational speed δnmax. The maximum change in rotational speed δnmax specifies the maximum value by which the rotational speed n may be changed by (if necessary repeated) application of the rule 10 shown in FIG. 3. The maximum change in rotational speed δnmax has the same leading sign as the change in rotational speed δn. Instead of the maximum change in rotational speed δnmax a corresponding numerical value can also be predetermined, for example that the rule shown in FIG. 3 may be applied a maximum of five times or eight limes.

For the sake of good order it should be pointed out that the term "rule parameter" is used to refer to a parameter for a rule 10. The term "rule parameter" is the opposite of a machining parameter, which refers to a parameter of the machining or target machining, for example the feed speed v or the rotational speed n. By contrast the term "rule parameter" is not used in the sense of a parameter of a closed loop control such as for example its proportional amplification.

Shown in FIG. 3 is a rule 10 in which, in the event of chattering, the rotational speed n of the tool 1 is changed. In a similar way it is possible, according to the diagram in FIG. 4, to formulate a similar rule 10 for the feed speed v. Here too at least one value for the change in velocity δv is predetermined, wherein the change in velocity δv is preferably supplemented by a hold time and/or a maximum change in velocity δvmax as a further rule parameter. The change in velocity δv is as a rule negative (reduction in the velocity v), but in exceptional cases can also be positive (increase in the velocity v). The hold time T can be specified independently of the hold time T of FIG. 3.

It is also possible to formulate a rule 10 in which a number of machining parameters of the target machining 9 not influencing the contour of the workpiece 2 are specified. For example in accordance with the diagram shown in FIG. 5 a rule 10 can be defined in which both a change in rotational speed δn and also a change in velocity δv are predetermined. In this case, if maximum change values δnmax, δvmax are specified (parameterized) as well, the maximum change in rotational speed δnmax and the maximum change in velocity δnmax (corresponding rule parameters) are determined independently of one another. Through the predetermination of different maximum changes δnmax, δvmax it can be achieved for example that, when chattering occurs, initially both the rotational speed n and also the path velocity v are changed. If however chattering occurs once again later, where necessary only that machining parameter n, v is changed for which the change has not yet reached its maximum value δnmax, δvmax. The hold time T however—at least as a rule—is uniform for both changes. Here too however the hold time T can be specified independently of the hold time T of FIGS. 3 and 4.

Furthermore the selection, parameterization and/or specification of the sequence of the rules 10 can also specify a series of a number of parameters of the target machining 9 not influencing the contour of the workpiece 2. For example according to the diagram shown in FIG. 6, a rule 10 can be defined in accordance with which the change in velocity δv has the value 0 (i.e. no change is made to the path velocity v) provided the change in rotational speed δn has not yet reached its maximum value δnmax. If on the other hand it has, a change in velocity δv is undertaken in the event of further chattering. Here too parameters can again be set if required for a hold time T and/or a maximum change in velocity δvmax. The hold time T too can also be parameterized independently of the hold times T of FIGS. 3 to 5. The two hold times T of the rule 10 of FIG. 6 can alternatively be parameterized uniformly or independently of one another.

Furthermore it is possible, through corresponding selection or parameterization, to specify a rule 10 in which it is predetermined which measures will be taken if the chattering continues to occur despite modification of the machining. For example according to the diagram in FIG. 7 it can be predetermined that in this case machining should be stopped ("STOP").

It is even possible to specify whether, after a modification of the machining of the workpiece 2, the modification is cancelled again in the event of the chattering no longer occurring. For example according to the diagram in FIG. 8, by appropriate parameterization, a rule 10 corresponding to the rule 10 of FIG. 3 can be specified, in accordance with which the modification of the rotational speed n of the tool 1 is cancelled again, provided chattering no longer occurs after the modification. The change in rotational speed δn of FIG. 8 specifies the stages in which the modification of rule 3 will be cancelled again.

Figure 8:
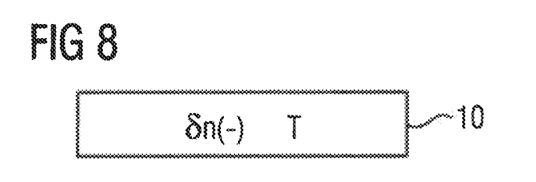

The leading sign of the change in rotational speed δn from FIG. 8 must be inverse to the leading sign of the change in rotational speed δn of FIG. 3. This is indicated in FIG. 8 by the change in rotational speed δn specified there having a minus sign "−" after it in brackets. The amount of the change in rotational speed δn of FIG. 8 can be determined independently of the value of the change hi rotational speed δn of FIG. 3, however. The hold time T, provided it is parameterized, can also be parameterized independently of the hold times T of FIGS. 3 to 6. The maximum value of the change of the rule 10 in accordance with FIG. 8 is produced entirely by itself by the rotational speed n that is specified by the target machining 9 being reached again for a total value of the change of 0.

Figure 4:
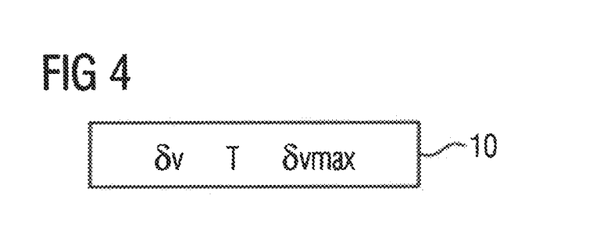
Figure 5:
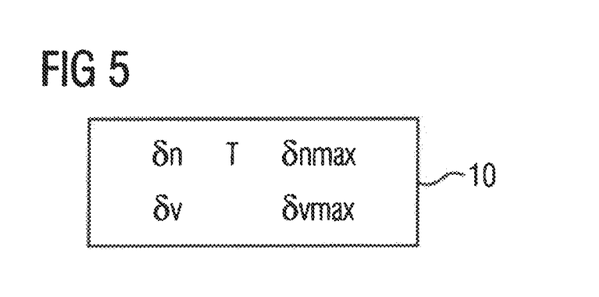
Figure 6:
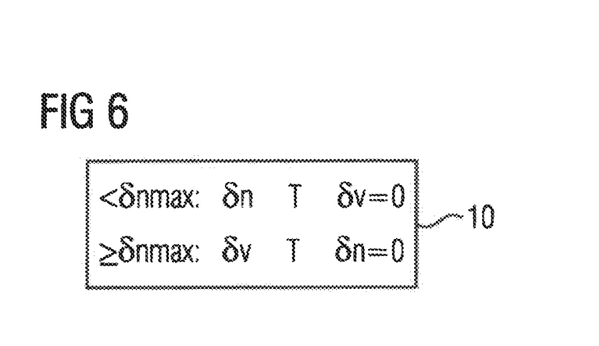
Figure 7:
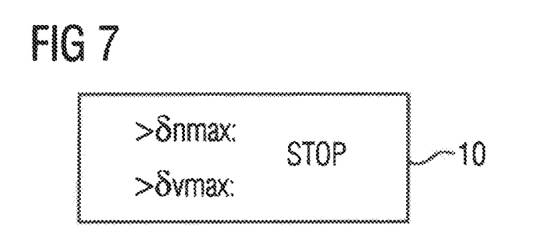

Rules 10 similar to the rule 10 of FIG. 8 are of course also able to be implemented for the rules 10 in accordance with FIGS. 4 to 6.

Figure 9:
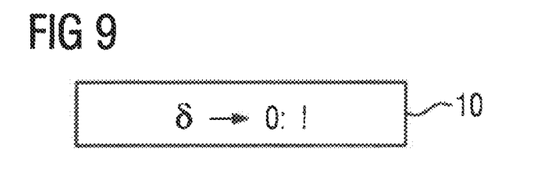

It is even possible to predetermine a rule 10 in accordance with which the control device 6 stores the type of machining found if, after a modification of the machining, the chattering no longer occurs. The carrying out of this rule 10 initially requires, according to the diagram in FIG. 9, that any modification of the machining of the workpiece 2 has been undertaken, indicated in FIG. 9 by a "δ". Furthermore the control device 6 must establish that after the modification of the machining the chattering no longer occurs. This is indicated in FIG. 9 by an arrow pointing from the "δ" to a 0. The storage is indicated in FIG. 9 by a "!". This enables the stored type of machining to be able to be retrieved for a later machining of a further workpiece similar to the workpiece 2, so that if necessary it can immediately be applied again—with or without a further check as to whether chattering is likewise occurring with a similar workpiece.

Figure 10:
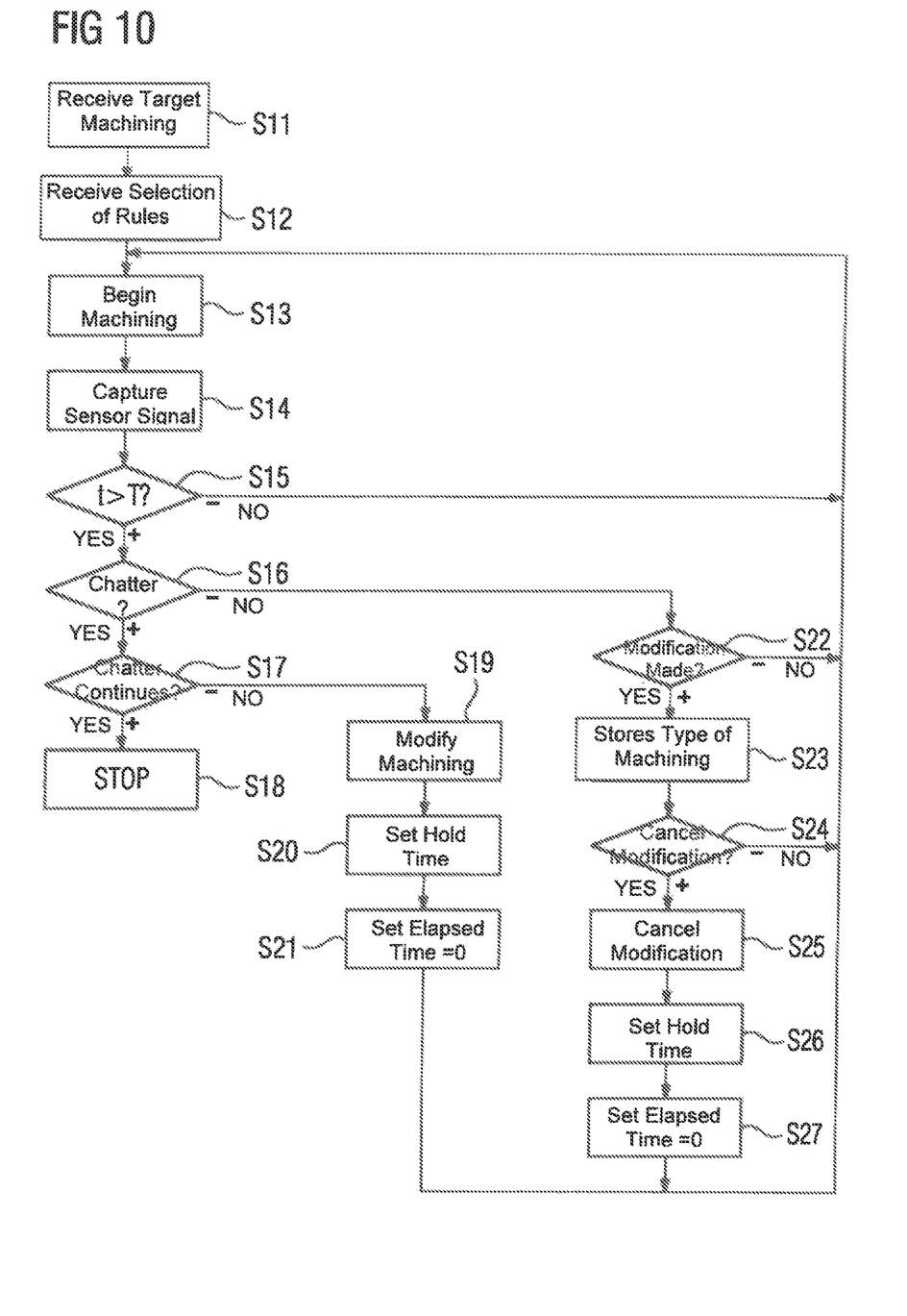
FIG. 10 shows a flow diagram.

The principle of the present invention already explained above in conjunction with FIG. 2 can therefore be embodied according to FIG. 10. FIG. 10 here actually shows a combination of a number of advantageous embodiments of the inventive procedure. The advantageous embodiments are able to be implemented independently of one another however.

In accordance with FIG. 10 the control device 6 receives a target machining 9 in a step S11. Furthermore, in a step S12, the control device 6 receives a selection, a parameterization and/or a specification of a sequence of the rules 10. In a step S13 the control device 6 then begins the machining of the workpiece 2 by the tool 1. During the machining of the workpiece 2 the control device 6 captures a sensor signal S, in a step S14, by means of (at least) one sensor 13. The steps S11 to S14 correspond 1:1 to the steps S1 to S4 of FIG. 2.

In a step S15 the control device 6 checks whether a time that has elapsed t exceeds a hold time T. The definition of the relevant hold time T will be discussed later. For as long as the elapsed time t does not exceed the hold time T the control device 6 returns to step S13. Otherwise the control device 6 checks, by evaluating the signal in a step S16, whether chattering is occurring during the machining of the workpiece 2 by the tool 1. The step S16 corresponds 1:1 to the step S5 of FIG. 2.

If chattering occurs, the control device 6 checks in a step S17 whether the chattering is continuing to occur despite the modification. The checking of step S17 can for example also comprise whether permitted changes of parameters n, v of the machining of the workpiece 2 have already reached their maximum change values δnmax, δvmax.

If the control device 6 establishes in step S17 that the chattering is continuing to occur despite modification of the machining, in a step S18 the control device 6 carries out those rules 10 in which the procedures to be followed in this case are specified. For example the control device 6, in accordance with the diagram in FIG. 10—cf. the rule 10 shown in FIG. 7—can stop the further machining of the workpiece 2.

Otherwise, thus when the machining has not yet been modified or when the permitted changes of machining parameters n, v of the machining of the workpiece 2 have not yet reached their maximum change values δnmax, δvmax, the control device 6, in a step S19, modifies the machining of the workpiece 2 by the tool 1 according to the selected and/or parameterized rules 10, where necessary taking account of the sequence of the rules 10. The step S19 essentially corresponds to the step S6 of FIG. 2.

In a step S20 the control device 6 sets the hold time T defined by the corresponding rule 10. Furthermore the control device 6, in a step S21, sets the elapsed time t to the value 0. Then the control device 6 returns to step S13.

When the control device 6 establishes in step S16 that no chattering is occurring, the control device 6 goes to a step S22. In step S22 the control device 6 checks whether a modification has already been made. If this is not the case the control device 6 returns to step S13. Otherwise, in a step S23, the control device 6 stores the type of machining found, for example the current rotational speed n and/or the current path velocity v.

In a step S24 the control device 6 checks whether it should cancel the modification previously undertaken again. If this is not the case the control device 6 returns to step S13. Otherwise, in a step S25, the control device 6 (using the corresponding rules 10 of course) cancels the modification previously undertaken completely or partly again.

In a step S26 the control device 6 sets the hold time T defined by the corresponding rules 10. Furthermore the control device 6, in a step S27, sets the elapsed time t to the value 0. Then the control device returns to step S13.

Further embodiments are of course also possible. Thus it is possible for example for the control device 6 to check between the carrying out of steps S16 and S17 whether a type of machining is already stored and no chattering occurs for the currently prevailing situation of machining the workpiece 2. In this case the control device 6 can where necessary select the corresponding type of machining directly and from there return directly to step S13. It is furthermore also possible to specify other rules 10, for example a rule 10 which, when executed, brings about a modulation of the rotational speed n or a rule 10 which, when executed, brings about a change to the control parameters of the position-controlled axes 3 and/or of the speed-controlled axis 4, i.e. to parameters of the position-controlled axes 3 and/or of the speed-controlled axis 4. It is also possible for the control device 6 to additionally output a message if chattering has been established. If chattering has been rectified by modifying the machining it is furthermore possible for the control device 6 to output the corresponding modifications via the interface 11.

The present invention has many advantages. In particular it is made possible for the operator 12 to select, to parameterize and/or to specify the sequence of the predefined rules 10 of the control device 6 in such a way that the reaction of the control device 6 to chattering is tailored individually to the circumstances of the machining. The operator 12 is given the capability of incorporating their empirical knowledge of avoiding chattering directly into the control device 6.

Although the invention has been illustrated and described in greater detail by the preferred exemplary embodiment, the invention is not restricted by the disclosed examples and other variations can be derived herefrom by the person skilled in the art, without departing from the scope of protection of the invention.

What is claimed is:

1. A method for machining a workpiece by a tool of a machine tool, comprising:
   storing predefined rules in a control device of the machine tool, wherein the predefined rules define modifications to the machining of the workpiece when undesired vibrations occur during the machining;
   specifying machining parameters for a target machining of the workpiece;
   with the control device
   receiving the target machining, according to which the workpiece is to be machined by the machine tool;
   receiving via a first interface embodied as a human-machine interface from an operator or via a second interface to a memory device arranged outside the control device and read by the control device, a selection of the predefined rules, a parameterization of the predefined rules, or a specification of a sequence of the predefined rules, the parameterization comprising a specified hold time, and executing the selected predefined rules in the specified sequence;
   controlling the machine tool so that the workpiece is machined by the machine tool;
   during the machining of the workpiece by the machine tool, evaluating captured sensor signals to check whether or not the undesired vibrations are occurring;
   when the undesired vibrations do not occur, carrying out the machining according to the target machining, and
   when the undesired vibrations occur, modifying the machining according to the predefined rules and maintaining the modified machining unchanged during the hold time, and following expiration of the hold time and when the undesired vibrations no longer occur, returning to the target machining with the specified machining parameters.

2. The method of claim 1, wherein the selection, the parameterization and/or the specification of the sequence of the predefined rules specifies a sequence or a coupling of a change of several of the machining parameters of the target machining that do not affect a contour of the workpiece.

3. The method of claim 1, wherein the selection or the parameterization of the predefined rules defines at least one of the machining parameters of the target machining that does not affect changes in a contour of the workpiece.

4. The method of claim 1, wherein the parameterization of the predefined rules specifies stages in which the modified machining is reversed and the machining returns to the target machining with the specified parameters.

5. The method of claim 1 further comprising, when the undesired vibrations no longer occur after the machining has been modified, storing a type of the modified machining without the undesired vibrations, for subsequent retrieval for a later machining of a further workpiece similar to the workpiece.

6. A control program for a control device of a machine tool, wherein the control program is embodied on a non-transitory computer-readable medium and comprises machine code, which when loaded into a memory of the control device and executed by the control device, causes the control device to     store predefined rules, wherein the predefined rules define modifications to machining of a workpiece when undesired vibrations occur during the machining;

receive a target machining with specified machining parameters, according to which the workpiece is to be machined by the machine tool;

receive via a first interface embodied as a human-machine interface from an operator or via a second interface to a memory device arranged outside the control device and read by the control device, a selection of the predefined rules, a parameterization of the predefined rules, or a specification of a sequence of the predefined rules, the parameterization comprising a specified hold time, and executing the selected predefined rules in the specified sequence;

control the machine tool so that the workpiece is machined by the machine tool;

during the machining of the workpiece by the machine tool, evaluate sensor signals captured by a sensor disposed on the machine tool to check whether or not the undesired vibrations are occurring;

when the undesired vibrations do not occur, carry out the machining according to the target machining, and     when the undesired vibrations occur, modify the machining according to the predefined rules and maintain the modified machining unchanged during the hold time, and following expiration of the hold time and when the undesired vibrations no longer occur, returning to the target machining with the specified machining parameters.

7. A control device of a machine tool, wherein the control device is programmed with a control program embodied on a non-transitory computer-readable medium and comprises machine code, which when loaded into a memory of the control device and executed by the control device, causes the control device to     store predefined rules, wherein the predefined rules define modifications to machining of a workpiece when undesired vibrations occur during the machining;

receive a target machining with specified machining parameters, according to which the workpiece is to be machined by the machine tool;

receive via a first interface embodied as a human-machine interface from an operator or via a second interface to a memory device arranged outside the control device and read by the control device, a selection of the predefined rules, a parameterization of the predefined rules, or a specification of a sequence of the predefined rules, the parameterization comprising a specified hold time, and executing the selected predefined rules in the specified sequence;

control the machine tool so that the workpiece is machined by the tool;

during the machining of the workpiece by the machine tool, evaluate sensor signals captured by a sensor disposed on the machine tool to check whether or not the undesired vibrations are occurring;

when the undesired vibrations do not occur, carry out the machining according to the target machining, and     when the undesired vibrations occur, modify the machining according to the predefined rules and maintain the modified machining unchanged during the hold time, and following expiration of the hold time and when the undesired vibrations no longer occur, returning to the target machining with the specified machining parameters.

\* \* \* \* \*